US005912450A

United States Patent [19]
Katz et al.

[11] Patent Number: 5,912,450
[45] Date of Patent: Jun. 15, 1999

[54] BAR CODE SCANNER UTILIZING TIME-MULTIPLEXED SCAN LINES

[75] Inventors: Joseph Katz, Stony Brook; Boris Metlitsky, Mt. Sinar, both of N.Y.; Emanuel Marom, Tel Aviv, Israel

[73] Assignee: Symbol Technologies, Inc., Holtsville, N.Y.

[21] Appl. No.: 08/864,452

[22] Filed: May 28, 1997

Related U.S. Application Data

[60] Continuation of application No. 08/458,880, Jun. 2, 1995, Pat. No. 5,712,470, which is a division of application No. 08/098,991, Jul. 29, 1993, Pat. No. 5,545,886, which is a division of application No. 07/864,367, Apr. 6, 1992, Pat. No. 5,258,605, which is a continuation of application No. 07/493,134, Mar. 13, 1990, abandoned.

[51] Int. Cl.$^6$ ..................................................... G06K 07/10
[52] U.S. Cl. ........................................... 235/462; 235/472
[58] Field of Search .................................... 235/462, 472, 235/454, 470, 469

[56] References Cited

U.S. PATENT DOCUMENTS

| | | |
|---|---|---|
| 3,680,049 | 7/1972 | Tsukada . |
| 3,736,410 | 5/1973 | Ragland et al. . |
| 3,801,775 | 4/1974 | Acker . |
| 3,812,325 | 5/1974 | Schmidt . |
| 3,819,910 | 6/1974 | Scantlin . |
| 3,928,759 | 12/1975 | Sansone . |
| 3,946,205 | 3/1976 | Melugin et al. . |
| 4,040,740 | 8/1977 | Handtmann et al. . |
| 4,057,784 | 11/1977 | Tafoya . |
| 4,135,663 | 1/1979 | Nojiri et al. . |
| 4,195,772 | 4/1980 | Nishimura . |

(List continued on next page.)

FOREIGN PATENT DOCUMENTS

| | | |
|---|---|---|
| 38 39 772 C2 | 7/1994 | Denmark . |
| 152733 | 8/1985 | European Pat. Off. . |
| 0 460 609 A1 | 12/1991 | European Pat. Off. . |
| 56-105562 | 8/1981 | Japan . |
| 62-150486 | 4/1987 | Japan . |
| 62-150486 | 7/1987 | Japan . |
| 63-133280 | 6/1988 | Japan . |
| 63-198177 | 6/1988 | Japan . |
| 1-152683 | 6/1989 | Japan . |
| 1-152683 | 9/1989 | Japan . |
| 2-53191 | 2/1990 | Japan . |
| 3-212778 | 9/1991 | Japan . |
| 89/06016 | 6/1989 | WIPO . |
| WO 89/06016 | 6/1989 | WIPO . |

OTHER PUBLICATIONS

Scanning Imaging, vol. 1028, EC01, 21–23 Sep. 1988, Hamburg, Federal Republic of Germany, *Semiconductor Laser Digital Scanner*, H. Sekii, et al., pp. 245–249.

IBM Technical Disclosure Billetin, vol. 23, No. 8, Jan. 1981, *Scanner With Tandem Stationary Holographic Discs*, LD. Dickson and W. J. Walsh, pp. 3828–3830.

Optical Engineering, vol. 29, No. 3, Mar. 1990, *Semiconductor Laser Digital Scanner*, Akiro Fujimoto, et al., pp. 230–232.

Fujimoto et al., "Semiconductor Laser Digital Scanner", Mar. 1990, Optical Engineering, vol. 29, pp. 230–232.

Dickson et al., Scanner With Tandem Stationary Holographic Disc, (Jan. 1981).

Sekii et al., "Semiconductor Laser Digital Scanner", SPIE Proceedings vol. 1028, Conf. on Scanning Image, Sep. 21–23, 1988.

*Primary Examiner*—Le Thien Minh
*Attorney, Agent, or Firm*—Kirschstein, et al.

[57] ABSTRACT

A bar code reader and method of reading a bar code symbol successively generates scan patterns at different times on the symbol. Preferably, two light sources are alternately energized to alternately produce two scan lines across the symbol. Each scan line reflects light from the symbol. The reflected light is detected by a photodetector which, in turn, generates an electrical signal. This signal is decoded into data corresponding to the symbol.

16 Claims, 6 Drawing Sheets

U.S. PATENT DOCUMENTS

| | | |
|---|---|---|
| 4,217,487 | 8/1980 | Kjeer . |
| 4,251,798 | 2/1981 | Swartz . |
| 4,315,245 | 2/1982 | Nakahara et al. . |
| 4,369,361 | 1/1983 | Swartz et al. . |
| 4,387,297 | 6/1983 | Swartz et al. . |
| 4,409,470 | 10/1983 | Shepard et al. . |
| 4,460,120 | 7/1984 | Shepard et al. . |
| 4,473,746 | 9/1984 | Edmonds . |
| 4,481,667 | 11/1984 | Price et al. . |
| 4,496,831 | 1/1985 | Swartz et al. . |
| 4,548,463 | 10/1985 | Cato et al. . |
| 4,591,242 | 5/1986 | Broockman et al. . |
| 4,593,186 | 6/1986 | Swartz et al. . |
| 4,605,846 | 8/1986 | Duret et al. . |
| 4,629,876 | 12/1986 | Kubota et al. . |
| 4,673,805 | 6/1987 | Shepard et al. . |
| 4,698,797 | 10/1987 | Komatsu . |
| 4,734,566 | 3/1988 | Senda et al. . |
| 4,736,095 | 4/1988 | Shepard et al. . |
| 4,743,773 | 5/1988 | Katana et al. . |
| 4,758,717 | 7/1988 | Shepard et al. . |
| 4,760,248 | 7/1988 | Swartz et al. . |
| 4,806,742 | 2/1989 | Swartz et al. . |
| 4,813,034 | 3/1989 | Mashimo . |
| 4,818,856 | 4/1989 | Matsushima et al. . |
| 4,818,886 | 4/1989 | Drucker ................................. 235/462 |
| 4,897,532 | 1/1990 | Swartz et al. . |
| 4,900,907 | 2/1990 | Matusima et al. . |
| 4,933,538 | 6/1990 | Heiman et al. . |
| 5,028,770 | 7/1991 | Miyazaki et al. . |
| 5,073,702 | 12/1991 | Schuhmacher . |
| 5,151,581 | 9/1992 | Krichever et al. ...................... 235/467 |
| 5,280,161 | 1/1994 | Niwa ...................... 235/462 |
| 5,446,267 | 8/1995 | Stanzani et al. ........................ 235/440 |

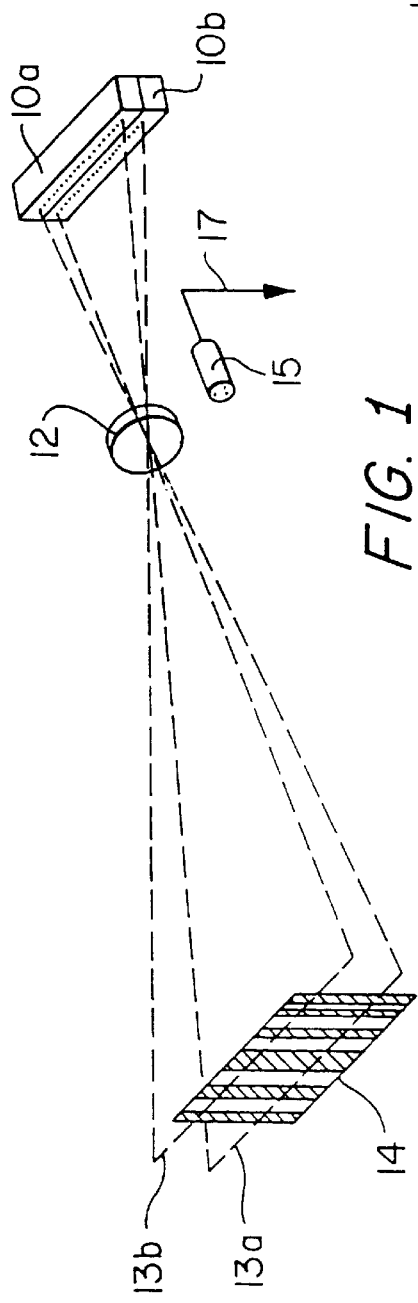
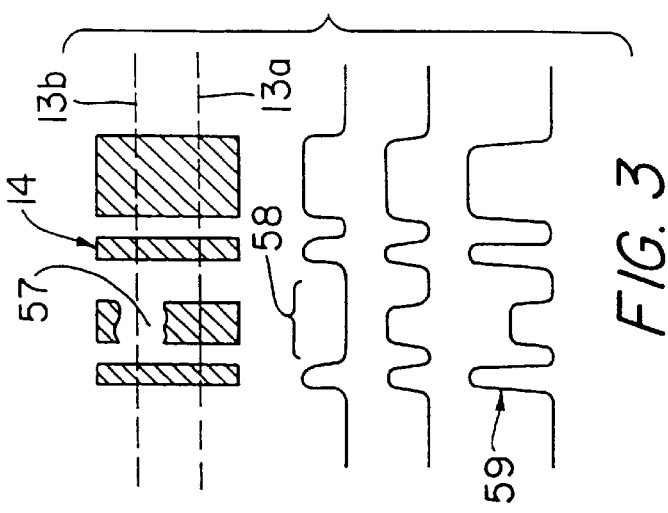
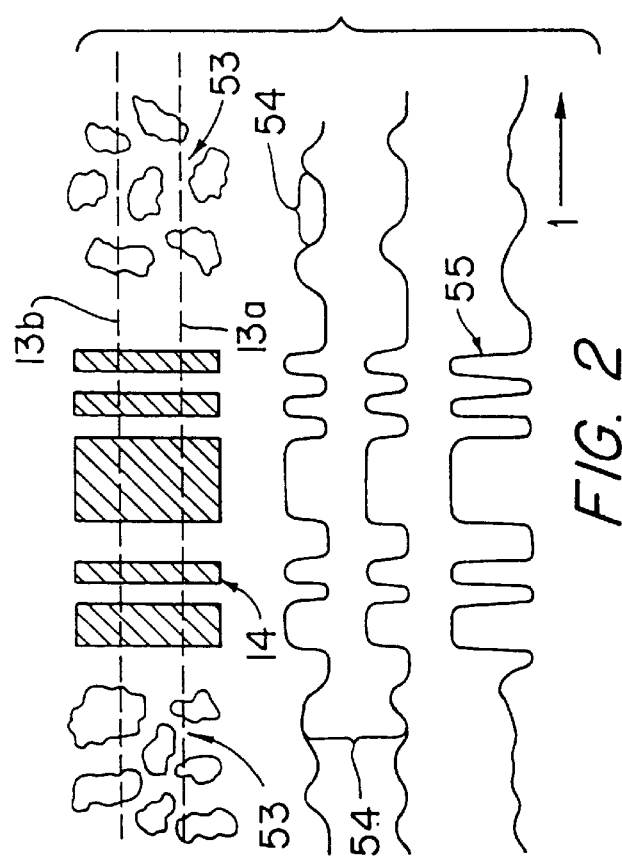

BAR CODE SCANNER UTILIZING TIME-MULTIPLEXED SCAN LINES

This is a continuation of application Ser. No. 08/458,880, filed Jun. 2, 1995, now U.S. Pat. No. 5,712,470, which application is a divisional of Ser. No. 08/098,991 filed Jul. 29, 1993, now U.S. Pat. No. 5,545,886, which application is a divisional of Ser. No. 07/864,367 filed Apr. 6, 1992, now U.S. Pat. No. 5,258,605, which is a continuation of Ser. No. 07/493,134, filed Mar. 13, 1990, now abandoned.

BACKGROUND OF THE INVENTION

This invention relates to bar code reader devices, and more particularly to apparatus for generating a scanned light beam for use in reading bar code symbols.

Bar code readers are disclosed in U.S. Pat. Nos. 4,387,297, 4,409,470, 4,251,798, and 4,760,248, all assigned to Symbol Technologies, Inc. The bar code readers described in these patents, as well as other devices of this type that are commercially available, usually employ oscillating mirrors or similar mechanical means to generate a scanning pattern. While such devices are widely used in retail and other business establishments today and have been quite successful in accomplishing their objectives, there is nevertheless a continuing requirement to improve reliability, reduce power consumption, reduce size and weight, lower the parts cost and manufacturing cost, and increase the speed and accuracy of operation. One of the elements of the prior bar code scanners most susceptible to improvement along these lines is the mechanical scanner device. The scanner devices may consist of a mirror mounted on a stepper motor; the mirror includes a flat portion to direct the outgoing laser beam and also a concave portion to collect reflected light and focus it upon a photodetector.

Bar code readers employ decoding circuitry to interpret the signals produced by a photodetector receiving the reflected light from the bar code symbol. Conventional decoding schemes rely upon data collected by a single scanning spot moved linearly across the field where the bar code symbol is located. The bar code data is embedded in background noise, and the decoding circuitry is more effective if the signal can be enhanced. To this end, faster scanning rates would permit the implementation of multiple scans to increase reliability of the data collected, but the mechanical scan generators previously used constrict the speed and thus place limitations on the multiple scan approach.

It is the principal object of the invention to provide a bar code reader or the like that does not require mechanical devices such as oscillating mirrors to cause a light beam to scan a symbol to be read. Another object is to provide a bar code reader that is capable of faster scan, as by implementing the scan with no moving parts. A further object is to take advantage of fast scanning techniques to provide multiple scans to thereby increase the signal recovery ability, i.e, increase the likelihood of recovering a valid decode of the bar code signal. In addition, the capability of providing multiple scans using a fast scan method permits improved facility for reading two dimensional bar code symbols of the type having multiple rows of bar code patterns. Other objects include reducing the size, weight and power consumption of a laser scan type of bar code reader, as well as reducing the manufacturing cost and increasing the reliability and operating lifetime of such devices.

SUMMARY OF THE INVENTION

To achieve the objects and in accordance with the purpose of the invention, as embodied and broadly described herein, a bar code reader includes a scanning light beam generator for producing two scan patterns to successively impinge on a bar code symbol to be read. Preferably, the generator includes a pair of light sources each emitting a light beam, and a scanner for moving each light beam as a scan line across the symbol. A controller successively activates the generator to produce the scan patterns at different times. A photodetector generates an electrical signal responsive to light reflected from the symbol by each scan pattern at each time. A decoder decodes the electrical signal from at least one of the scan patterns into data corresponding to the symbol being read. Preferably, the light sources are alternately energized to alternately generate the scan lines.

In accordance with another embodiment of the present invention, a method is provided for reading a bar code symbol, comprising the steps of producing two scan patterns to successively impinge on the symbol, successively generating the scan patterns at different times, generating an electrical signal responsive to light reflected from the symbol by each scan pattern at each time, and decoding the electrical signal from at least one of the scan patterns into data corresponding to the symbol.

The time-multiplexed scan lines allows the symbol to be read by one, or the other, or by both scan lines.

BRIEF DESCRIPTION OF THE DRAWINGS

The novel features characteristic of the invention are set forth in the appended claims. The invention itself, however, as well as other features and advantages thereof, will be best understood by reference to a detailed description of specific embodiments, when read in conjunction with the accompanying drawings, wherein:

FIG. 1 is a diagram in schematic form of a bar code scanner employing dual linear arrays of light sources instead of a single array as in FIG. 1, according to another embodiment of the invention;

FIG. 2 is a timing diagram showing events or voltage vs. time for certain occurrences in the system of FIG. 1 illustrating the cancellation of background noise;

FIGS. 3 and 4 are timing diagrams showing events or voltage vs. time for certain occurrences in the system of FIG. 1 illustrating compensation for faults in the bar code;

FIG. 4 is a timing diagram showing events or voltage vs. time for certain occurrences in the system of FIG. 1;

DETAILED DESCRIPTION OF THE PREFERRED EMBODIMENTS

Figure 4:
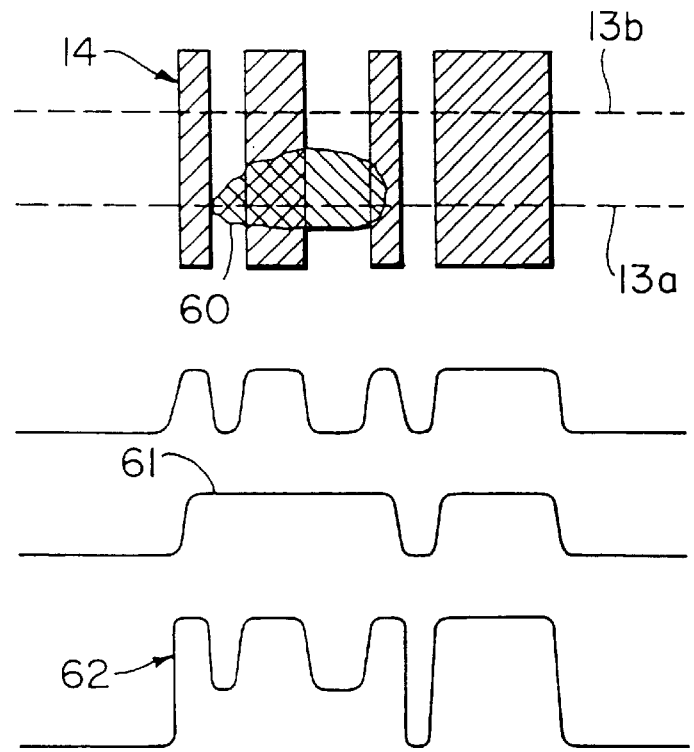

FIG. 1 shows a scanning that uses two linear arrays 10 and 10b. Use of two linear arrays 10 and 10b provides two scan lines 13a and 13b, one above the other, separated from one another by a distance corresponding to the physical separation of the arrays 10a and 10b and the magnification in the optical system 12. This dual scan line technique may be advantageously employed in several ways. First, if the two rows of laser diodes 11 in the two arrays 10a and 10b are activated in parallel, in the same sequence, then the two scan lines 13a and 13b are likewise in sync; in this case if the two scan lines traverse the same bar code symbol 14, the reflected light received by the photodetector 15 is also in sync from the two scans 13a and 13b. The advantage of having two scan lines may be understood by reference to FIG. 2, where the background areas 53 are seen to return uncorrelated signals 54, whereas the bar code symbol returns correlated waveforms from the two parts of the symbol 14 being scanned by the two scan lines 13a and 13b. The single detector 15 collects reflected light from the two scans at the same time and sums the intensities of the reflections, so the contrast of the overall signal 55 detected from the bar code 14 is enhanced. On the other hand, the areas 53 outside the bar code symbol 14 will result in different signals, and so the overall contrast from these areas is reduced. The digitizing circuitry used to shape the analog waveform on the line 17 and recover the bar code information can more readily distinguish the transitions in the bar code region of the signal from the uncorrelated returns from the areas 53. Referring to FIGS. 3 and 4, another advantage to the dual scans of FIG. 1 is that bar code imperfections can be compensated for. If the bar code symbol 14 has a defect in the form of a gap 57 as seen in FIG. 3, then the signal returned by the scan line 13b would have a corresponding false area 58 whereas the return from the scan line 13a would be valid. The composite signal 59 on the line 17 at the output of the photodiode 15 would still be able to be interpreted to recover valid data. Similarly, as illustrated in FIG. 4, if the defect is in the form of a black spot 60, the light return for one scan line will have a false area 61 appearing as if there was a very wide bar in the symbol, but the composite electrical signal 62 representing the sum of both scans 13a and 13b has distinct transitions and can be decoded to produce valid bar code data.

Figure 5:
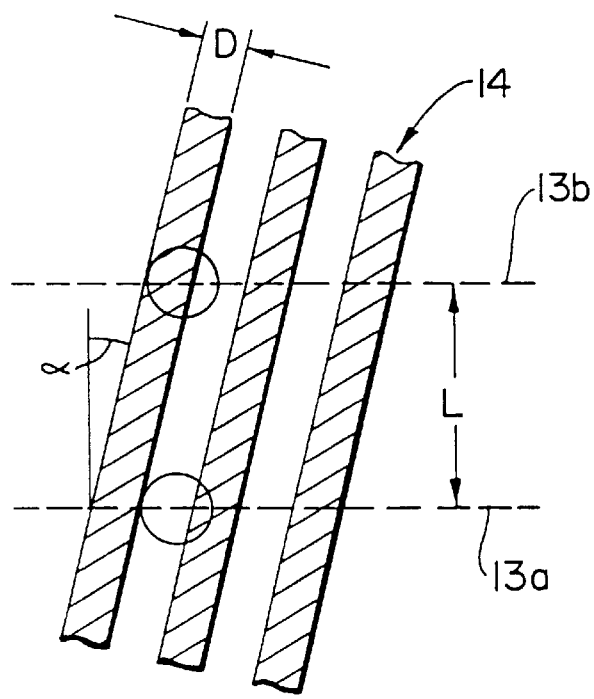
FIG. 5 is an enlarged view of a bar code symbol being scanned by dual light beams, illustrating permissible tilt.

When two scan lines 13a and 13b are used as illustrated in FIG. 1, the scan lines should be perpendicular to the individual bars of the symbol 14. The permissible misalignment depends upon the bar code density and the amount of physical separation between the two scan lines 13a and 13b. Referring to FIG. 5, assuming the diameter of the spot in the scan lines 13a or 13b to be larger than the minimum width D of a bar (or space), the maximum permissible tilt angle α is given by $$\tan \alpha \approx (0.5D)/L$$

where L is the separation between the two scan lines 13a and 13b.

In FIG. 1 an embodiment of the invention is shown having two arrays 10a and 10b, producing two scan lines 13a and 13b, but the number can be larger than two. Three or more scan lines provide the same types of benefits as just discussed, but to a greater degree. In addition, however, the capability of simultaneously scanning multiple bar code patterns is available.

Figure 6:
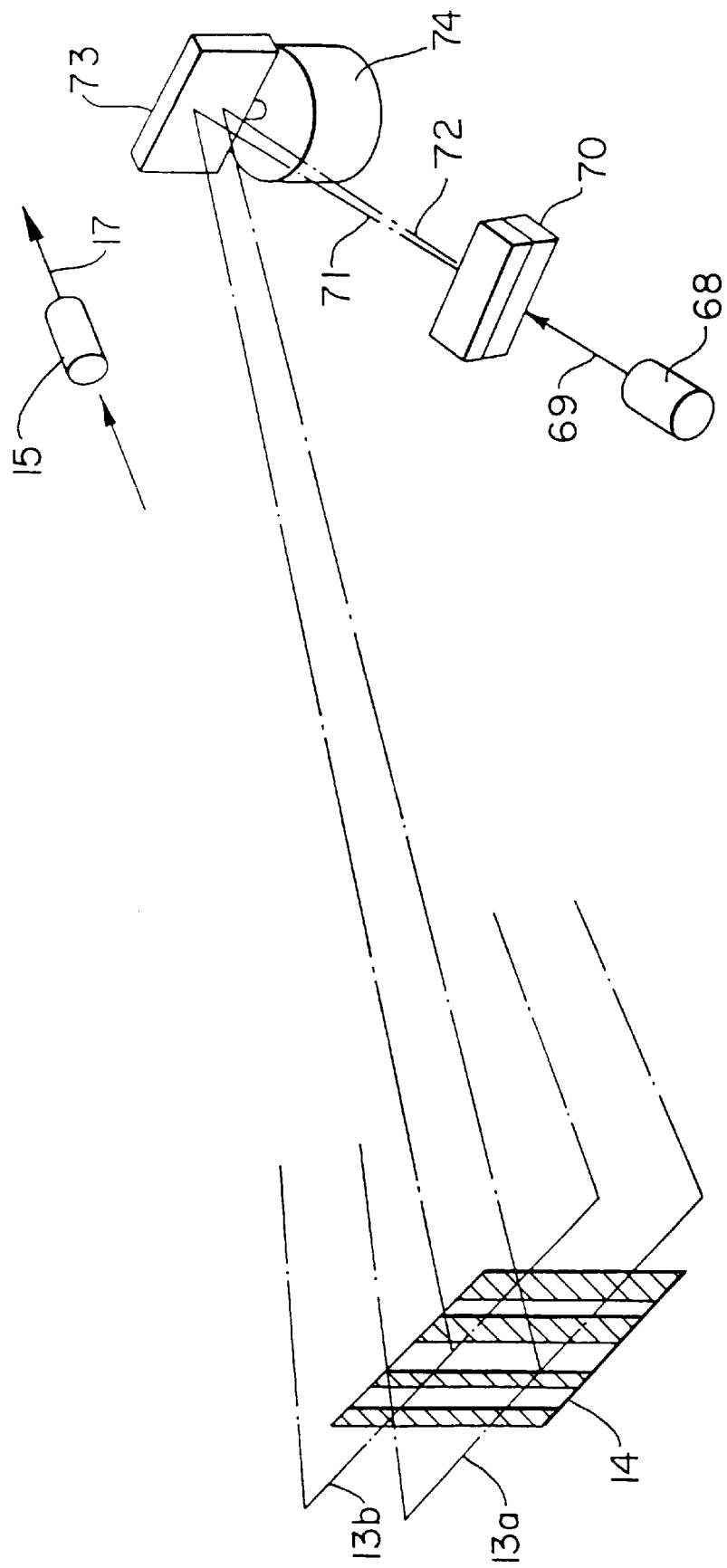
FIG. 6 is a pictorial view of a bar code scanner system corresponding to FIG. 1, employing two scan lines, but using a single light source along with a beam splitter.
Figure 7:
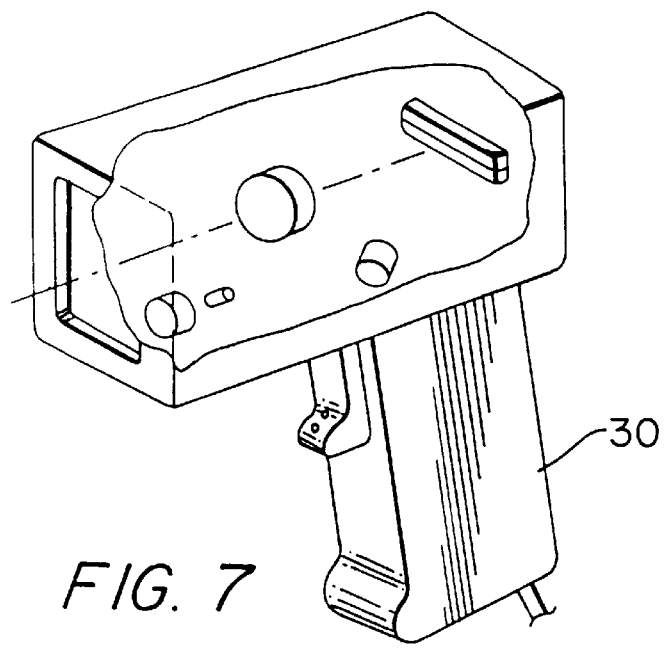
FIG. 7 shows a hand held housing.
Figure 8:
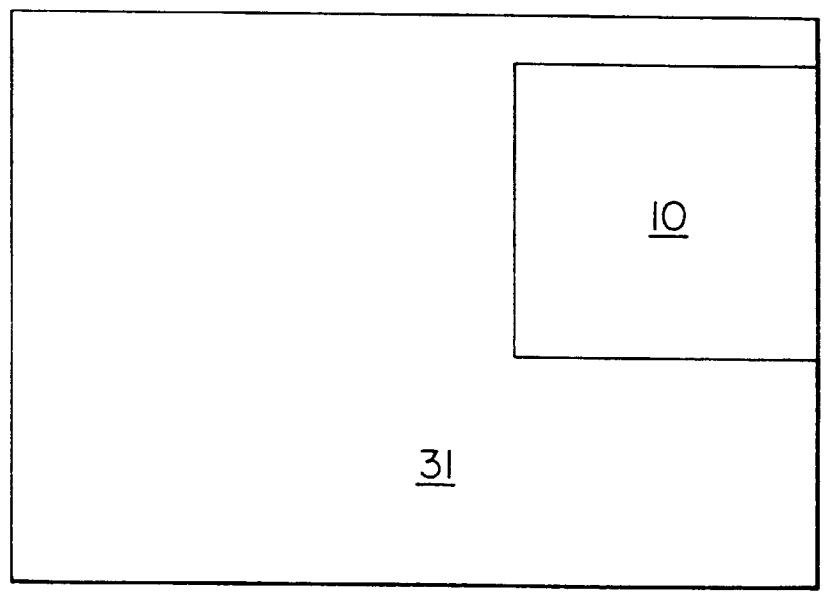
FIG. 8 shows a stationary housing.

Referring now to FIG. 6, a bar code scanner may produce dual scan lines 13a and 13b as in FIG. 1, but, according to another embodiment of the invention, the dual scan lines are produced by a single light source 68 emitting a beam 69 that passes through a beam splitter 70 to generate two separate beams 71 and 72. The two beams are directed to a scanning mirror 73 driven by a motor 74, from which the beams are directed out through a suitable lens system 75 to impinge upon the bar code symbol 14 as the two scan lines 13a and 13b. The assembly of FIG. 6 may be mounted in a hand-held housing 30 shown in FIG. 7, or as scanner 10 attached to stationary housing 31 in FIG. 8. The embodiment of FIG. 6 operates to provide improved resolution and decoding as discussed above with reference to FIGS. 2, 3 and 4.

Figure 9:
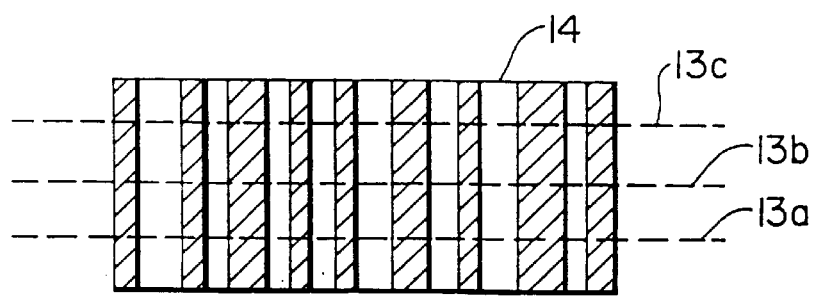
FIG. 9 is a diagram of a bar code symbol scanned with three scan lines.

As disclosed above with reference to FIG. 1, the number of scan lines utilized in the embodiment of FIG. 6 is not limited to the two scan lines 13a and 13b illustrated, but instead may be more than two scan lines 13a, 13b and 13c or, as illustrated in FIG. 9, a number of scan lines 13a, 13b and 13c may be advantageously used to scan a conventional bar code symbol 14 to obtain greater resolution, fault correction, etc. These three scan lines 13a, 13b and 13c are generated by a single light source using a beam splitter and a mechanical scan mirror as in FIG. 6.

Figure 10:
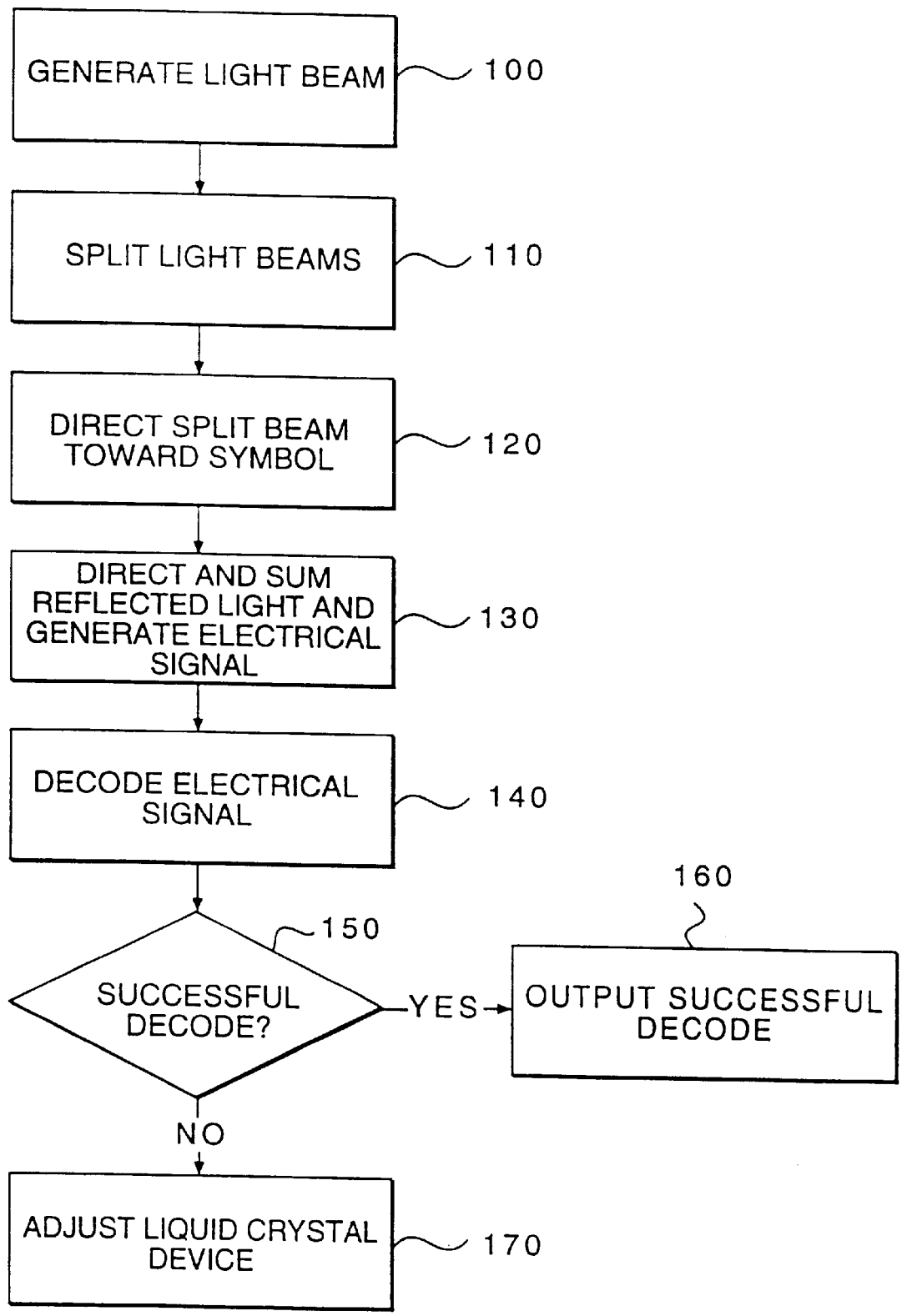
FIG. 10 is a flow chart of the steps for scanning a bar code symbol.

FIG. 10 is a flow chart of the steps for scanning a bar code using the scanner shown in FIG. 6. A light beam is generated (step 100). The light beam is split using a liquid crystal device (step 110). The split light beams are directed toward a bar code using a moveable mirror (step 120). The light reflected from the bar code is detected and summed and an electrical signal is produced (step 130). This electrical signal is decoded (step 140). If the decoding is determined to be successful (step 150), the successful decode is output (step 160). Otherwise, electrical signals applied to the liquid crystal device are adjusted so that a successful reading of the bar code symbol may be obtained (step 170).

Figure 11:
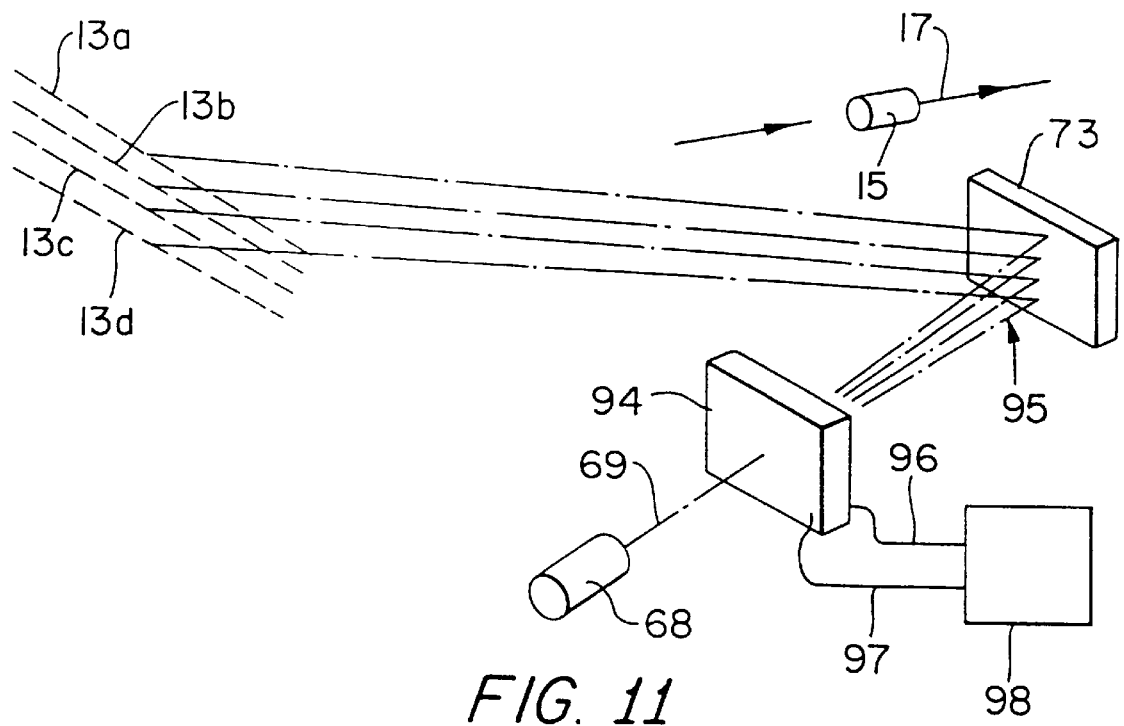
FIG. 11 is a diagrammatic view of a bar code scanner corresponding to FIGS. 1 or 6, employing multiple scan lines, using a single light source along with a liquid crystal device as a beam splitter.

Referring to FIG. 11, another embodiment of the invention is shown wherein multiple scan lines 13a, 13b, 13c and 13d are generated from a single laser source 68 by a liquid crystal device 94. As in FIG. 6, the beam 69 produced by the laser source 68 is split into multiple beams 95, and a mechanical device such as an oscillating mirror 73 moves these beams simultaneously across the area of the bar code symbol as the multiple scan lines 13a, etc. The liquid crystal device 94 has a voltage applied to it by lines 96 and 97, and the magnitude and frequency of the voltage determines the number of beams 95 produced and thus the number of scan lines. In this manner, the beam 95 may be dynamically changed from a single beam to a split beam, by varying a voltage source 98. For example, the signal produced on line 17 from the photodetector 15 may be of poor quality using one scan line, but may be decodable using multiple scan lines as discussed above with reference to FIGS. 2, 3 and 4, so the control program executed by the microprocessor 20 may cause the voltage generator 98 to switch to a multiple scan line condition if a valid decode is not obtained with one scan line. Alternatively, the control program may cause a switch from multiple scan to one scan line if more intensity is needed, since the beam splitting would reduce the level of illumination with a constant output of source 68.

Figure 12:
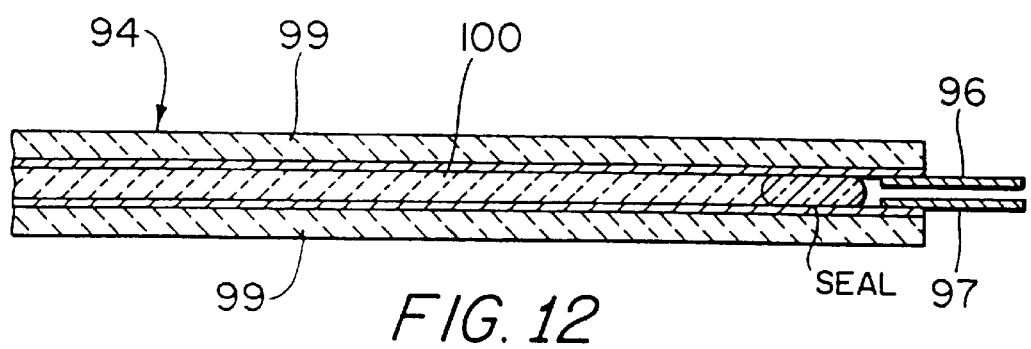
FIG. 12 is a sectional view of the liquid crystal device shown in FIG. 11.

Referring to FIG. 12, the liquid crystal device 94 may comprise two glass plates 99, each coated with a conductive film, and a liquid crystal material 100 sandwiched between the conductive plates. The material 100 may be, for example, a p-methoxy-benzylidene or p-n-butyl-aniline.

The liquid crystal device 94 of FIG. 11 is capable of splitting the beam 69 into more than two beams, and so the voltage source 97 may apply voltages of several levels to produce a selection of the number of scan lines needed, depending upon the conditions detected.

Although according to various features of the invention the scan generation may use oscillating mirrors, the embodiments of bar code scanner devices as with no moving parts as described above have several advantages for some purposes, when compared to scanners that use electromechanical components. First, the scan rate can be much faster, so the amount of time the laser is on can be reduced, lowering power drain. The faster speed will also allow a large number of scans to be accomplished for one "read" operation, then the data signals correlated with one another using a suitable algorithm to increase the precision of the decode. Second, the scan pattern can be flexibly adapted, i.e., the scan can be tailored to fit the particular bar code symbol and position; e.g., after an initial scan it is determined that the location and width of the bar code symbol in the field of view is at a specific place, and so the field is re-scanned at only this location, which will use less power. Third, after an initial scan there can be a re-scan of only a small part that showed an ambiguous decode, attempting to get a valid decode of only the troublesome part. Fourth, improvements in reliability can be provided in a device with no moving parts but instead implemented with only electronic components and fixed optical devices.

In another aspect, the bar code scanner methods disclosed above wherein multiple scan lines are employed provide other features of importance. The reliability of the decoding process can be enhanced by producing a composite signal from multiple simultaneous scans, where the effects of noise or defects can be minimized. Or, the increased scanning speed permitted by the use of no moving parts allows the multiple scans to be sequential, one line at a time, which allows the reflected light from the multiple scan lines to be separated when using only one photodetector; this arrangement permits scanning of multiple-row bar code symbols or the like.

While this invention has been described with reference to specific embodiments, this description is not meant to be construed in a limiting sense. Various modifications of the disclosed embodiments, as well as other embodiments of the invention and variations in the character of the disclosed or other embodiments, will be apparent to persons skilled in the art upon reference to this description. It is therefore contemplated that the appended claims will cover any such modifications or embodiments, or variations therein, as fall within the true scope of the invention.

What is claimed is:

1. A bar code reader, comprising:
   a) a scanning light beam generator for producing two scan patterns to successively impinge on a bar code symbol to be read;
   b) a controller for successively activating the generator to produce the scan patterns at different times;
   c) a photodetector for generating an electrical signal responsive to light reflected from the symbol by each of the scan patterns at each of said times;
   d) a decoder for decoding the electrical signal from at least one of the scan patterns into data corresponding to the symbol being read; and
   e) a switching circuit for alternately switching to the decoder each electrical signal generated by the photodetector in response to light reflected from the symbol by the scan patterns.

2. The reader according to claim 1, wherein the generator includes two energizeable light sources for emitting light, and wherein the scan patterns are scan lines extending across the symbol.

3. The reader according to claim 2, wherein each light source is a laser diode.

4. The reader according to claim 2, wherein each light source is a light emitting diode.

5. The reader according to claim 2, wherein the generator includes a movable scan mirror for reflecting light from the sources to the symbol, and a drive for moving the scan mirror.

6. The reader according to claim 2, wherein the scan mirror is generally planar.

7. The reader according to claim 2, wherein the controller is operatively connected to the sources for alternately energizing the sources to alternately produce the scan lines.

8. The reader according to claim 2, wherein the scan lines impinge on the symbol having a single row of elements of different light reflectivity.

9. The reader according to claim 2, wherein the scan lines impinge on the symbol having multiple rows of elements of different light reflectivity.

10. The reader according to claim 1, wherein the decoder is part of a signal processor, and wherein the switching circuit is exterior to the signal processor.

11. The reader according to claim 1, wherein the decoder and the switching circuit are part of a signal processor.

12. A bar code reader, comprising:
    a) a scanning light beam generator for producing two scan patterns to successively impinge on a bar code symbol to be read;
    b) a controller for successively activating the generator to multiplex the scan patterns at different times;
    c) a photodetector for generating electrical signals responsive to light reflected from the symbol by the time-multiplexed scan patterns at said times; and
    d) a decoder including a demultiplexer for demultiplexing the electrical signals to recover a separate electrical signal for each scan pattern, and operative for decoding the recovered electrical signal from at least one of the scan patterns into data corresponding to the symbol being read.

13. A method of reading a bar code symbol, comprising the steps of:
    a) producing two scan patterns to successively impinge on the symbol to be read;
    b) successively generating the scan patterns at different times by time-multiplexing the scan patterns;
    c) generating electrical signals responsive to light reflected from the symbol by time-multiplexed scan patterns at said times; and
    d) demultiplexing the electrical signals to recover a separate electrical signal for each scan pattern, and decoding the recovered electrical signal from at least one of the scan patterns into data corresponding to the symbol being read.

14. The method according to claim 12, wherein step (a) is performed by energizing two light sources and producing each scan pattern as a scan line.

15. The method according to claim 14, wherein step (b) is performed by alternately energizing the light sources to alternately produce the scan lines.

16. The method according to claim 14; and further comprising the step of alternately switching each electrical signal prior to performing the decoding step.

* * * * *